T. R. DA PAZ & A. M. C. DE F. E MAYA.
MEANS FOR MAINTAINING THE LATERAL EQUILIBRIUM OF AEROPLANES.
APPLICATION FILED NOV. 22, 1911.
1,047,759.
Patented Dec. 17, 1912.
5 SHEETS—SHEET 4.
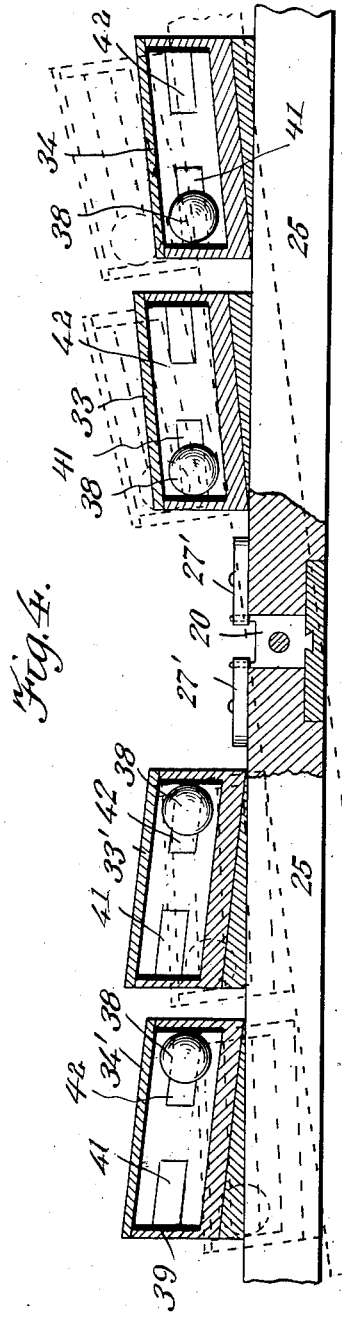
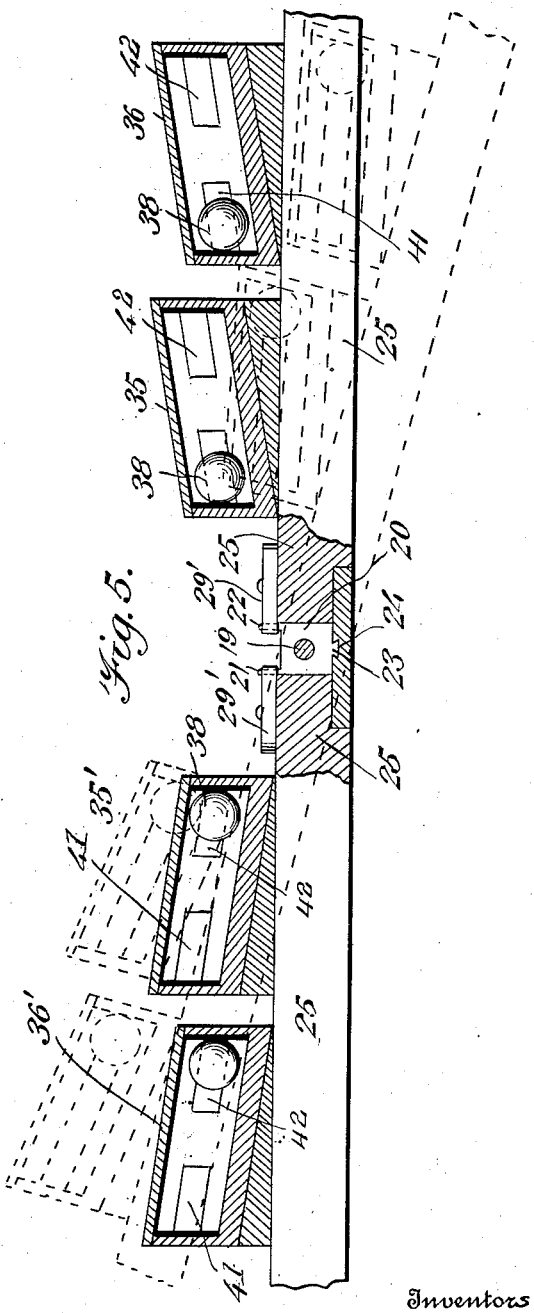

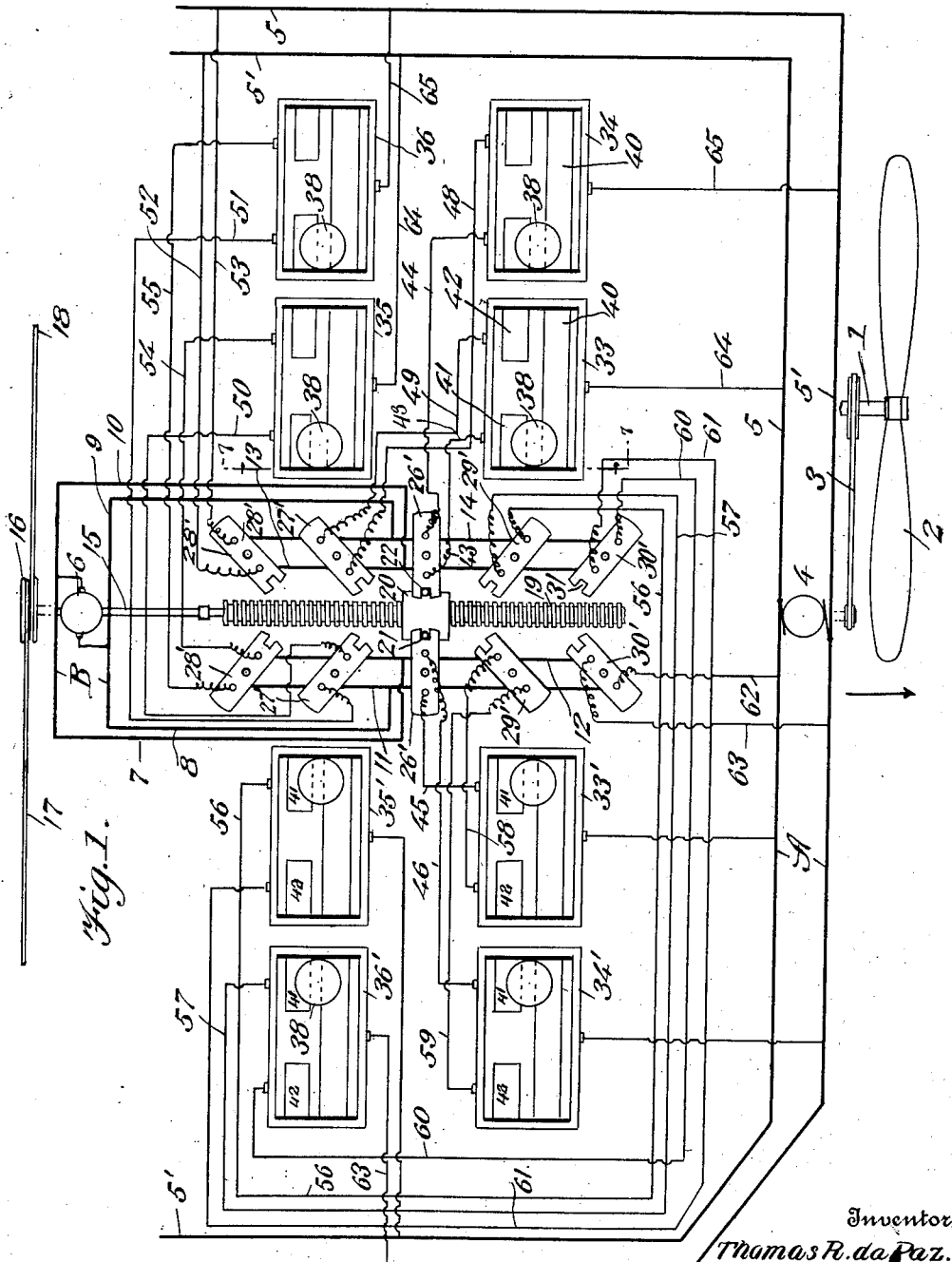

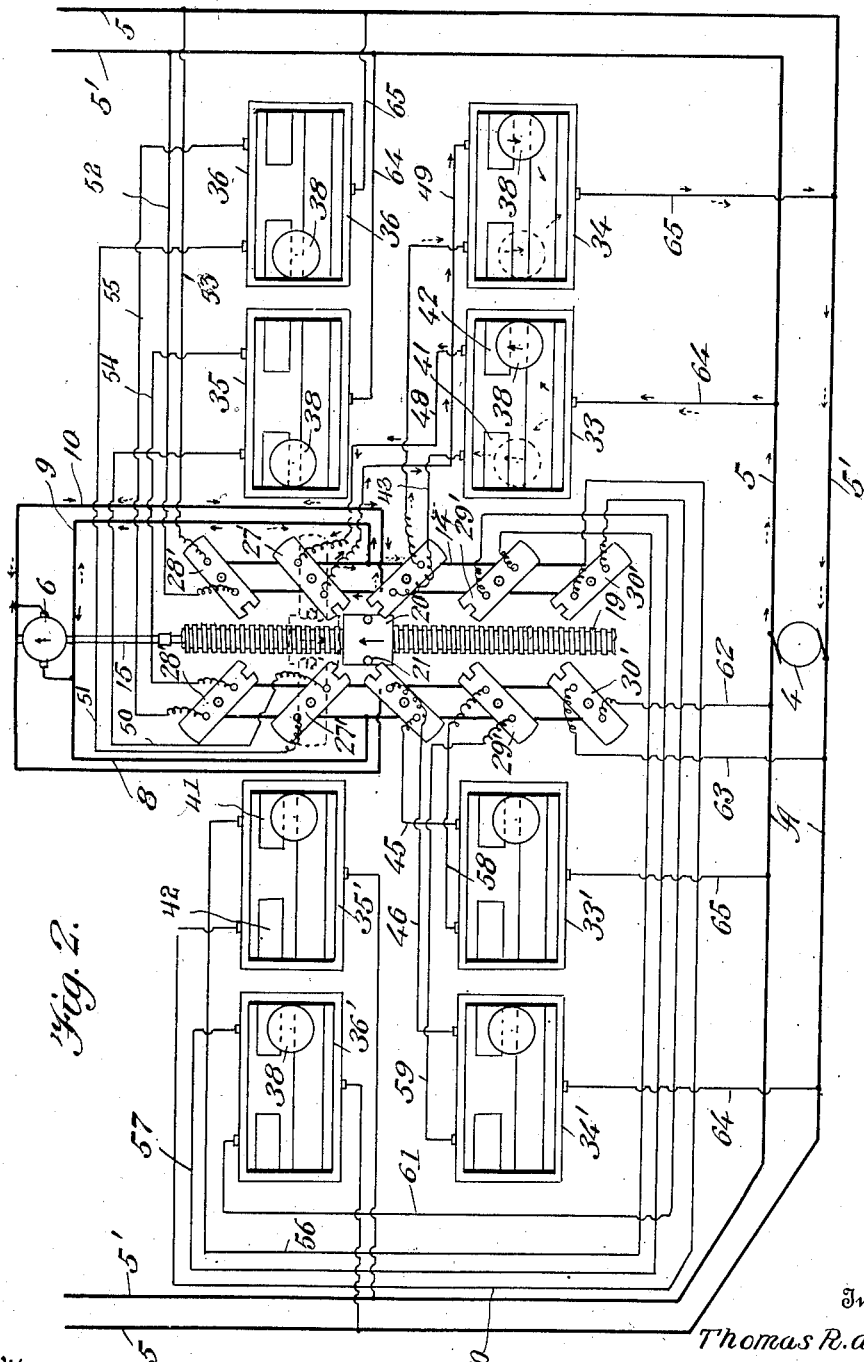

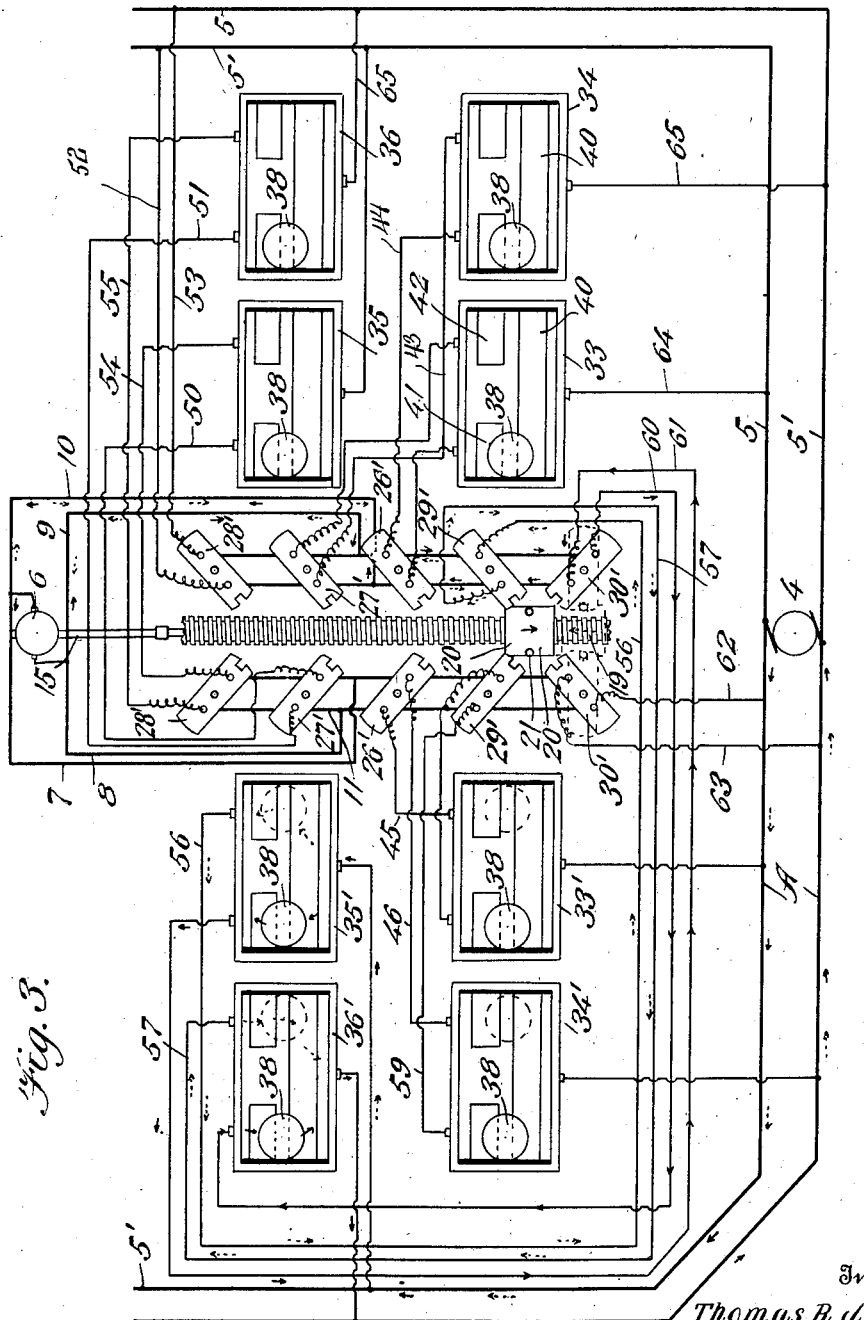

T. R. DA PAZ & A. M. C. DE F. E MAYA.
MEANS FOR MAINTAINING THE LATERAL EQUILIBRIUM OF AEROPLANES.
APPLICATION FILED NOV. 22, 1911.
1,047,759.
Patented Dec. 17, 1912.
5 SHEETS—SHEET 5.
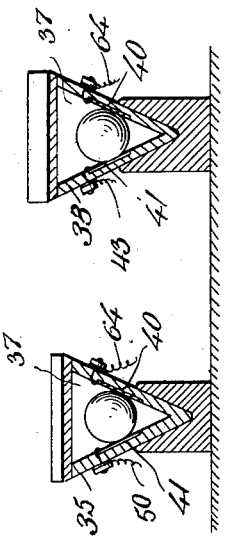
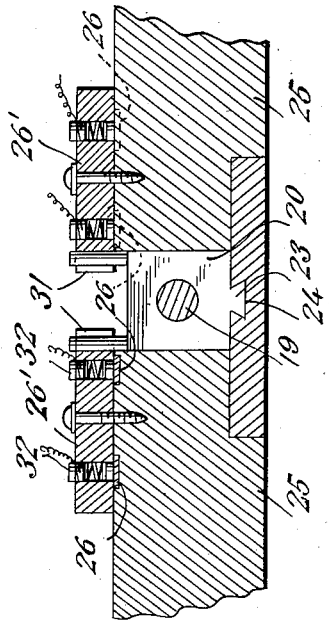
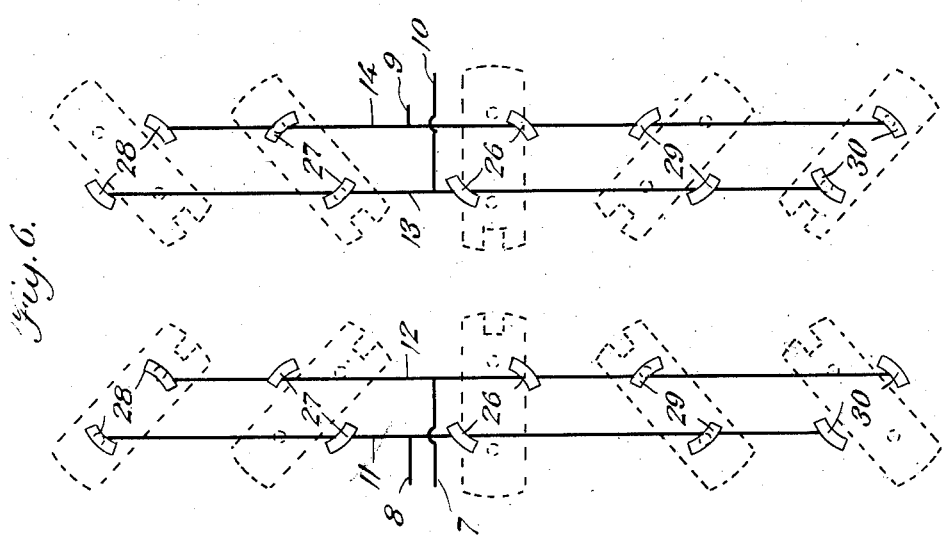
Witnesses
William R. Smith
C. G. Hines.
Inventors
Thomas R. da Paz
Affonso M. C. de F. e Maya
By Victor J. Evans
Attorney

UNITED STATES PATENT OFFICE.

THOMAS RODRIGUES DA PAZ AND AFFONSO MACHADO CANAVARRO DE FARIA E MAYA, OF SAN MIGUEL, AZORES.

MEANS FOR MAINTAINING THE LATERAL EQUILIBRIUM OF AEROPLANES.

1,047,759.  Specification of Letters Patent.  Patented Dec. 17, 1912.

Application filed November 22, 1911. Serial No. 661,835.

*To all whom it may concern:*

Be it known that we, THOMAS R. DA PAZ and AFFONSO M. C. DE F. E MAYA, citizens of Portugal, residing at San Miguel, Azores, have invented new and useful Means for Maintaining the Lateral Equilibrium of Aeroplanes, of which the following is a specification.

This invention relates to means for maintaining the lateral equilibrium of aeroplanes, the object of the invention being to provide simple and efficient gravity and electrically operated mechanism for controlling wing tips, ailerons or lateral balancing devices of any suitable kind, whereby, when the machine tilts laterally in either direction, the balance will be automatically restored.

A further object of the invention is to provide a balancing mechanism including an electric motor and circuit controlling devices coöperating therewith for gradually adjusting the wing tips or balancing devices to predetermined degrees according to the degree of tilting motion of the machine and for gradually returning the balancing devices to normal positions as the machine tilts back to the horizontal, whereby an easy and sensitive balancing action is secured.

With these and other objects in view, the invention consists of the features of construction, combination and arrangement of parts, hereinafter fully described and claimed, reference being had to the accompanying drawings, in which:—

Figure 1 is a diagrammatic plan view of the balancing apparatus and coöperating elements of an aeroplane, showing the parts in normal position, as when the aeroplane is balanced. Fig. 2 is a similar view showing the parts as adjusted to correct a minimum tilt in one direction. Fig. 3 is a similar view showing the parts adjusted to correct a tilt to a greater degree in the opposite direction. Fig. 4 is a vertical longitudinal section through the sets of circuit closers controlling the minimum degree tilt, and illustrating the operation when the machine tilts to such degree in one direction. Fig. 5 is a similar section through the sets of circuit closers controlling the maximum degree tilt, and illustrating the operation when the machine tilts to such degree in the opposite direction. Fig. 6 is a diagrammatic plan view of the switch mechanism, the pivoted switches appearing in dotted lines. Fig. 7 is a section on line 7—7 of Fig. 1. Fig. 8 is an enlarged detail transverse section through the middle switches of the switch mechanism.

Referring to the drawings, 1 designates a shaft driven by or from the propelling motor of the machine, and which may directly or indirectly operate the driving propeller 2. Coupled to the shaft 1 by a belt or other driving connection 3 is a generator 4 constantly driven to supply current to a supply circuit A formed by conductors 5 and 5'.

Arranged, in practice, parallel with the longitudinal center or axis of the machine is an electric motor 6 arranged in a circuit B formed of conductors 7, 8, 9 and 10, arranged in parallel with the conductors 11 and 12 and 13 and 14 of an automatic feed and reversing switch mechanism. Carried by the armature shaft 15 of the motor is a drum or pulley 16, upon which are oppositely wound the inner ends of cables 17 and 18 leading to ailerons, wing tips or other lateral stabilizing devices (not shown). These stability devices may be of any known type coupled for movement in opposite directions in unison, for simultaneous lifting and depressing actions at the opposite sides of the machine.

The conductors 7 and 8 are connected with one of the poles of the motor and the conductors 9 and 10 with the other pole of the motor, and the motor is thus arranged in parallel between the sides or sections of the circuit B formed by the respective pairs of conductors, each section constituting a circuit in itself through which current may be supplied in either direction through the armature field to rotate the armature shaft in either direction. Connected with the armature shaft is a feed screw 19, also arranged in the longitudinal axial line of the machine, and on which is arranged to travel a nut or switch controlling member 20 provided with a pair of spaced pins or projections 21 and 22. The nut has a dovetailed projection 23 (see Fig. 8,) arranged to travel in a dovetailed guideway 24 and between parallel bars 25 carrying bearings in which, in practice, the feed screw is suitably supported and journaled. Normally or in its neutral position the nut is arranged to coincide with the transverse axis of the machine, as shown in Fig. 1, which illustrate the position of the parts when the machine is horizontal or laterally balanced.

Connected with the sets of conductors 11 and 12 and 13 and 14 are duplicate pairs of segmental contacts 26, 27, 28, 29 and 30, adapted for respective coöperation with pairs of pivoted switches 26', 27', 28', 29' and 30', each having a notched inner end 31 and a pair of spring-actuated contacts 32. These switches are mounted to swing horizontally in a fore and aft direction, and the switches 26' are normally arranged in longitudinal alinement and parallel with the transverse axis of the machine and have their notched ends in engagement with the projections 21 and 22 of the nut, while the sets of switches in front and rear thereof normally incline at an oblique angle to the plane of travel of the nut with their notched ends in position to be engaged by the projections of the nut, the front switches 29' and 30' converging inwardly and rearwardly, while the rear switches 27' and 28' converge inwardly and forwardly. The switches 26', coöperate with the switches 27' and 28' to control the balancing devices when the machine tilts in one direction, and with the switches 29' and 30' to control the balancing devices when the machine tilts in the opposite direction.

Provided for coaction with the switches 26', 27' and 28' are pairs of circuit controllers 33 and 34 and 35 and 36, and provided for coaction with the switches 26', 29' and 30 are pairs of circuit controllers 33' and 34' and 35' and 36'. As shown, the controllers 33, 34, 33' and 34' are arranged in longitudinal alinement and in pairs on opposite sides of the longitudinal axis of the machine and in advance of the controllers 35, 36, 35' and 36', which are correspondingly arranged in rear thereof. Each controller comprises a trough 37 forming a guide channel for a contact ball or sphere 38 contained therein; said trough being V-shaped in cross section and having insulation 39 at its ends. The troughs incline inwardly and downwardly, so that the balls will be normally retained by gravity in a neutral position at their inner ends. At each side of the trough is a longitudinal conductor strip or contact 40 and at the opposite side of the trough are spaced conductor strips or contacts 41 and 42, arranged at the opposite ends of the trough. The balls of the controllers at each side of the machine normally connect the contacts 40 and 41, and the balls of the controllers at either side of the machine are adapted, when such side tilts downwardly, to roll outward and downward by gravity and connect the contacts 40 and 42. The troughs of the transversely alined front controllers at opposite sides of the machine incline at a less angle than the troughs of the transversely alined rear controllers at opposite sides of the machine, in order to provide for properly governing the stabilizers when the machine tilts to different degrees. For instance, the troughs of the transversely alined front controllers may incline at an angle of 6° and the troughs of the transversely alined rear controllers at an angle of 10°, so that through the action of the motor hereinafter described the stabilizers may be adjusted to the proper degree only to correct the tilting motion and the motor then reversed to return the stabilizers to normal position. Of course, the number of sets of controllers employed may be increased or decreased at will, that is, a single set may be employed for adjusting the stabilizers when the machine tilts in either direction to an objectionable degree, or more than two sets of controllers may be employed for a graduating or stepped operation when the machine tilts laterally in either direction to different degrees, in order that a sensitive balancing control may be obtained.

In practice, a manually-operable switch may be provided at any suitable point to cut the automatic controlling mechanism out of action without stopping the generator or suitable means may be provided for throwing the generator into and out of action, so that whenever desired the stabilizers may be manually operated by suitable means provided for that purpose.

The contacts 32 of one of the switches 26' are connected with the contacts 41 of the controllers 33 and 34 by conductors 43 and 44, while the contacts of the other switch 26' are connected with the contacts 41 of the controllers 33' and 34' by conductors 45 and 46. The contacts of one of the switches 27' are connected by conductors 48 and 49 with the contacts 42 of controllers 33 and 34, while the contacts of the other switch 27' are connected by conductors 50 and 51 with the contacts 41 of controllers 35 and 36. The contacts of one of the switches 28' are connected by conductors 52 and 53 with the conductors 5 and 5' at one side of the generator circuit A, while the contacts of the other switch 28' are connected by conductors 54 and 55 with the contacts 42 of controllers 35 and 36. Conductors 56 and 57 connect the contacts of one of the switches 29' with the contacts 41 of controllers 35' and 36', and conductors 59 and 58 connect the contacts of the other switch 29' with the contacts 42 of controllers 33' and 34'. Conductors 60 and 61 connect the contacts of one of the switches 30' with the contacts 42 of controllers 35' and 36', and conductors 62 and 63 connect the contacts of the other switch 30' with the conductors 5 and 5' of the generator circuit A at the opposite side of said circuit from the conductors 52 and 53. Conductors 64 and 65 connect the feed and return controllers of each set with the conductors 5 and 5' of the generator circuit A. This completes the wiring electrically connecting the main working parts of the apparatus.

The operation is as follows: Assuming that the vehicle is in aerial flight and laterally balanced, and that the parts are in the neutral position shown in Fig. 1, it will be apparent that while certain of the switches are in closed position, as illustrated in Fig. 6, to couple the parts of the circuits for the operations hereinafter described, the central switches 26' are in neutral position and the series of circuit closers in cut out position, so that no current can pass to the motor, whereby the stabilizers are held in a horizontal or normally inoperative for straight flight. When, however, the vehicle tilts downward at either side to an angle greater than 6° and less than 10°, the balls of the controllers 33 and 34 or 33' and 34', as the case may be, will roll outward in their channels and connect the contacts 40 and 42 of the acting controllers. Assuming that there is a down tilt at the left hand side, current will flow from the generator to the motor through the conductor 5, feed wire 6, contacts 40, 38 and 42 of controller 33, conductor 49, to and through one of the contacts 32 of one of the switches 27' and one of the contacts 27 to conductor 14, to and through the motor via conductor 9, and thence back to the conductor 5' of the generator circuit via conductor 10, conductor 13, the other contacts 27 and 32 of the aforesaid switch 27', conductor 48 and contacts 42, 38 and 40 of controller 34 and return conductor 65. The armature shaft will thus be turned in one direction to adjust the stabilizers for a lifting action at the depressed side and a depressing action at the elevated side. In such operation the screw is revolved to the right and the nut travels rearwardly, carrying with it the switches 26'. When said switches have swung rearwardly to an angle corresponding to the normal angle of the switches 29' and 30', their notched ends are freed from engagement with the pins of the nut and the left-hand switch 26' then engages and connects the associated contacts 26, to primarily set the circuit to reverse the direction of the current, but as, in such position, said left-hand contact 26' continues the line of feed connection between the conductors 64 and 9, the motor shaft will continue to revolve in the direction stated and the nut will engage and move the contacts 27' until they reach the transverse dotted line position shown in Fig. 2, at which time the left-hand switch 27' will reach a neutral position and the return of the machine to a balanced position will cause the ball 38 to roll back and connect contacts 40 and 41. The flow of the current will then be reversed and the motion of the motor shaft in the direction first mentioned arrested, and, as the machine is restored to its normal balance, the motor shaft is revolved in the opposite direction by the reversal of the current to return the stabilizers to normal position. In this operation current will flow from conductor 5 through conductor 64, contacts 40, 38 and 41 of the controller 33 and conductor 43 to one of the contacts 32 of the adjacent switch 26', thence through conductor 10 and reversely through the motor 6, and thence back through conductors 9 and 14 to the other contact 32 of said switch 26', to and through the underlying contact 26, conductor 44, contacts 41, 38 and 40 and conductor 65 to conductor 5' of the generator circuit. The motor will thus turn back the same number of revolutions it previously turned forward, restoring the parts to normal position and cutting off the current when the switches 26 are returned to their normal position.

It will be observed that the sets of contacts 26, 27, 28, 29 and 30 are so arranged that in the normal position of each set of switches 27', 28', 29' and 30' one switch of each set is in closed position and the other switch of the same set in open position, and that when the switches of either set are moved on their outstroke the closed switch will be opened and the opened switch closed, while the return movement of the switches will restore the original conditions mentioned. The switches 26', differ in operation from the others in that they are normally open, and that one switch is closed in the forward direction of movement of said switches from their normal position and the other switch closed in the rearward movement of said switches from their normal position, the switches 26' having both forward and backward and return motion. This construction, arrangement and mode of operation of the sets of switches is employed to secure the stabilizer adjusting and reverse movements of the motor and flow of the current for the various actions, one switch in each case operating as a direct feed switch and the other as a reverse feed switch, each alternating with another in such actions, as will be apparent through the tracing of the circuits in each of the various operations.

If, however, the machine should be depressed at the left hand side to an angle of 10°, it will be understood that the balls 38 of both sets of controllers 33 and 34 and 35 and 36 will roll outwardly and connect the several contacts 40 and 42 with the feed conductors 64 and return conductors 65. The current will then flow as first described and the rearward motion of the nut will continue until the contacts 26', 27' and 28' have been successively shifted and the switch 28' connects the associated contacts 28 and the balls 38 in returning to normal position coöperate with said switch and the switch 26', whereupon the motor will be revolved in the opposite direction and restore the stabilizers and switches to normal position, upon the completion of which the current will be cut off and normal conditions restored.

When the machine tilts downward to an angle of 6° or more, but less than 10°, the controllers 33' and 34' come into play and the nut feeds forward and coacts with the switches 26' and 29' and the conductors 7, 8, 11 and 12 to adjust the stabilizers for a lifting action at the left hand side, and to reverse the current and return the parts to normal position. When the machine tilts downward to an angle of 10° or more at the right hand side all of the controllers 33', 34', 35' and 36' will come into play and the nut will feed forward and coact with all of the switches 26', 29 and 30' and the conductors 7, 8, 11 and 12 to perform the described functions. In Figs. 4 and 5 we have respectively shown the parts in operation to control a 6° tilt at the right hand side and a 10° at the left hand side, the operating and return feed courses of the currents being indicated by full-line and broken-line arrows, respectively.

By the terms right hand side and left hand side we, of course, mean the side portions of the machine relative to the position of the seated aviator.

In the drawings we have shown the generator at the front and motor at the rear in the assumed line of travel of the machine, from which the operation of the stabilizing mechanism may be readily understood from the drawings and foregoing description.

Having thus described our invention, what we claim as new is:

1. In a stabilizing mechanism for aeroplanes, an electric circuit, a motor, stabilizing elements actuated by the motor, gravity controlled circuit closers, and switch mechanism coöperating therewith to set the motor into operation for a determined number of revolutions in one direction when the circuit is closed upon the tilting of the aeroplane, and to reverse the current for a corresponding number of revolutions of the motor in the reverse direction when the aeroplane returns to a balanced position.

2. In a stabilizing mechanism for aeroplanes, an electric supply circuit, a motor, a circuit including sets of conductors arranged in parallel and connected with the poles of the motor, a switch mechanism embodying sets of conductors arranged in parallel and respectively connected with sets of conductors of the motor circuit and provided with contacts and switches coöperating with said contacts to control the supply of current through either set of switch conductors and its return through the other, gravity controlled circuit closers governing the flow of current between the supply circuit and conductors of the switch mechanism, stabilizing elements actuated by the motor, and means actuated by the motor for operating the switches.

3. In a stabilizing mechanism for aeroplanes, an electric circuit, a motor, current supplying and reversing connections between said circuit and the motor, switches forming parts of said supplying and reversing connections, stabilizing elements actuated by the motor, gravity controlled circuit controllers coöperating with said switches, a screw shaft driven by the motor, and a nut actuated by said shaft to control and operate said switches.

4. In a stabilizing mechanism for aeroplanes, an electric supply circuit, a motor, a circuit including sets of conductors arranged in parallel and connected with the poles of the motor, a switch mechanism embodying sets of conductors arranged in parallel and respectively connected with sets of conductors of the motor circuit and provided with contacts and switches coöperating with said contacts to control the supply of current through either set of switch conductors and its return through the other, gravity controlled circuit closers governing the flow of current between the supply circuit and conductors of the switch mechanism, stabilizing elements actuated by the motor, a screw shaft driven by the motor, and a nut actuated by said shaft to control and operate said switches.

5. In a stabilizing mechanism for aeroplanes, balancing devices including a motor, a supply circuit, connections between said circuit and the motor including switches for supplying current through said connections to drive the motor in either direction, a screw shaft operated by the motor, a device operated by said shaft and controlling said switches, and gravity controlled circuit closers coöperating with the switches to control the connections to operate the motor in either direction for a balancing action and for reversing its direction of motion to return the balancing elements to normal position after actuation.

6. In a stabilizing mechanism for aeroplanes, balancing devices including a motor, a supply circuit, a motor driven generator in said circuit, connections between said circuit and the motor including switches for supplying current through said connections to drive the motor in either direction, a screw shaft operated by the motor, a device operated by said shaft and controlling said switches, and gravity controlled circuit closers coöperating with the switches to control the connections to operate the motor in either direction for a balancing action and for reversing its direction of motion to return the balancing elements to normal position after actuation.

In testimony whereof we affix our signatures in presence of two witnesses.

THOMAS RODRIGUES DA PAZ.
AFFONSO MACHADO CANAVARRO
DE FARIA E MAYA.

Witnesses:
ARISTIDES AMBAR RAPON,
M. L. CREEVEY.